Figure 1:
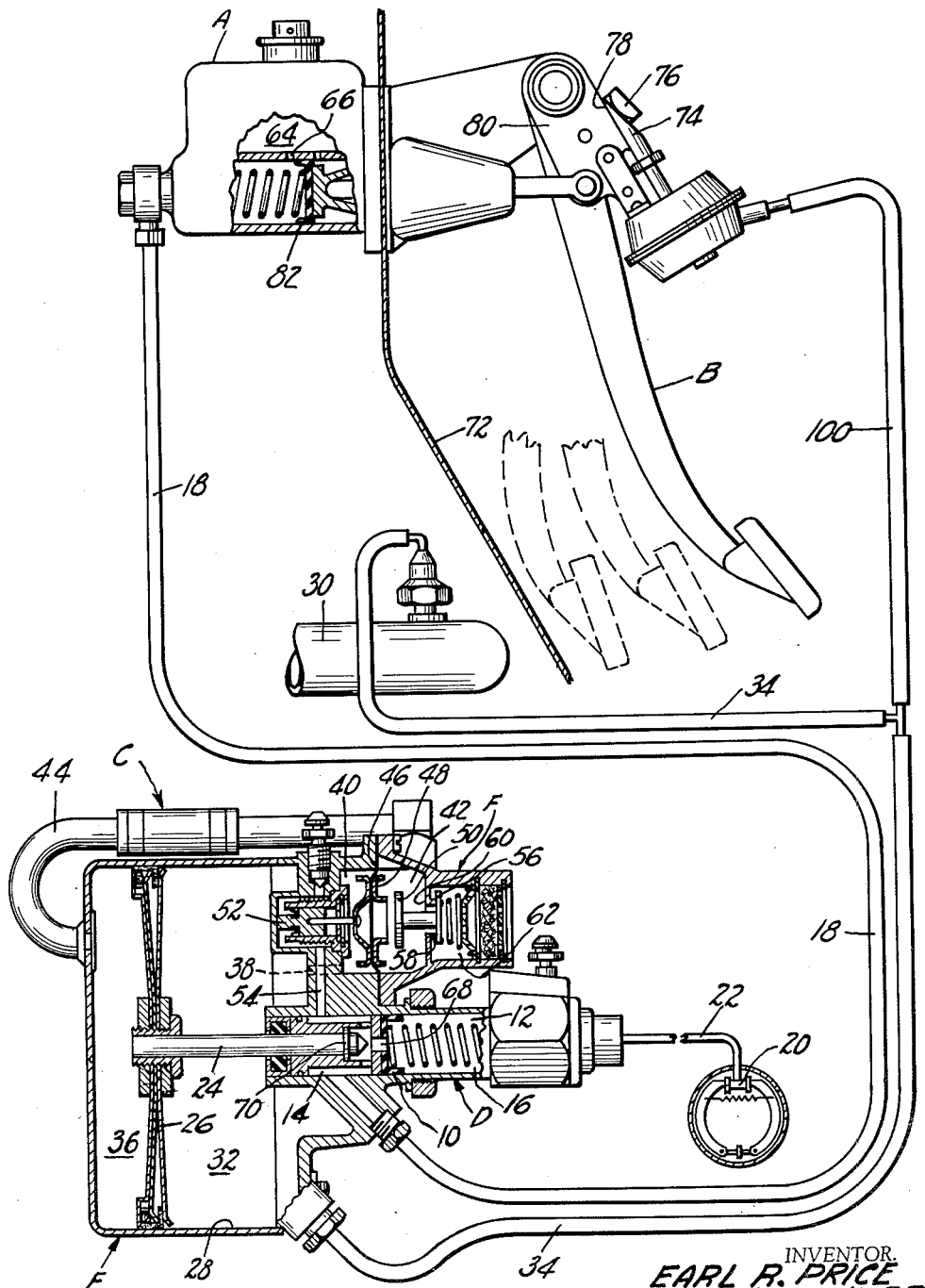

United States Patent Office 3,031,849
Patented May 1, 1962

3,031,849
LOW INPUT BRAKING SYSTEM
Earl R. Price and Edward E. Hupp, South Bend, Ind., assignors to The Bendix Corporation, a corporation of Delaware
Filed June 18, 1957, Ser. No. 666,331
4 Claims. (Cl. 60—54.5)

The present invention relates to control systems of the type used in connection with fluid pressure servo-motor driven hydraulic pressurizing devices as used in automotive hydraulic braking systems and the like in which the hydraulic input signal to the servo-motor driven unit normally by-passes the hydraulic pressurizing device of the unit except during power actuation of the servo-motor; and more particularly to improved systems of the above described type in which power actuation of the servo-motor is prevented from closing said by-pass when insufficient fluid pressure remains in the power supply system for the servo-motor to permit the servo-motor to intensify the hydraulic input signal.

The fluid pressure servo-motor driven hydraulic braking systems currently being used in automotive vehicles employ a power operated secondary pressurizing device having a movable wall therein separating its pressure intensifying chamber from a "follow-up" chamber through which the power actuated member for the movable wall extends. Hydraulic input pressure from the primary, or manually operated, pressurizing device is continually communicated to the "follow-up" chamber; and a by-pass across the movable wall is usually provided such that the pressure input signal from the primary pressurizing device can be communicated directly with the pressure intensifying chamber whenever the movable wall is not power driven by the force transmitting member. One of the difficulties encountered in such systems is that a negative mechanical advantage exists between the hydraulic input signal pressure, and the discharge pressure of the secondary device when the by-pass is closed off and substantially no force is exerted upon the movable wall by means of the power actuating member—this is true by reason of the fact that the area of the movable wall subjected to the hydraulic input signal is smaller than the area of the movable wall subjected to pressure in the pressurizing chamber of the secondary pressurizing device.

An object of the present invention is, therefore, the provision of a new and improved system of the above described type having means which will disable the power unit of the servo-motor (thereby preventing the by-pass in its pressure intensifying chamber from being closed) when the intensity of the fluid pressure used to power actuate the servo-motor decreases below a value capable of off-setting the negative mechanical advantage encountered in the secondary pressurizing device when its by-pass is closed.

Another object of the present invention is the provision of a new and improved system of the above described type in which there is provided a primary pressurizing device, or master cylinder, having a two-position actuating lever: one position of which is capable of providing a large displacement to the master cylinder when insufficient fluid pressure exists for the satisfactory power operation of the servo-motor, and the other position of which provides a low pedal position whose remaining stroke provides a smaller displacement that is sufficient to actuate the braking system when power is available to actuate the secondary pressurizing device—the improvement comprising a pneumatically actuated snap acting device which will immediately snap the foot pedal lever from its second position to its first position before the pressure intensity of the power supply to the fluid pressure servo-motor and to the pneumatic actuated snap acting device reaches a value wherein the snap acting device would no longer be capable of assuring proper movement of the lever into its second position.

Another object of the present invention is the provision of a new and improved pneumatically actuated device having a power chamber therein divided into opposing chambers by a movable wall which is normally urged toward one end of the power chamber by means of a spring; and which movable wall is caused to move toward the other end of the power chamber to compress the spring whenever a differential pressure applied across the movable wall exceeds a predetermined value—the unit further including valve means actuated by the movable wall for preventing a secondary stream of fluid pressure from entering one of the opposing chambers to decrease the pressure differential across the movable wall when the movable wall is in its position adjacent the second end of said power cylinder, and for opening up communication of said second stream of fluid to diminish the pressure differential across the movable wall when the pressure differential of the power supply to the device falls below a predetermined value, and whereupon said spring immediately snaps the movable wall into its first described position.

A still further object of the present invention is the provision of a new and improved combined pneumatic snap acting device of the above described type constructed and arranged to immediately drop the intensity of the pressure differential in the power supply system for the unit when the intensity of the pressure differential of its supply system falls below a predetermined value.

Figure 2:
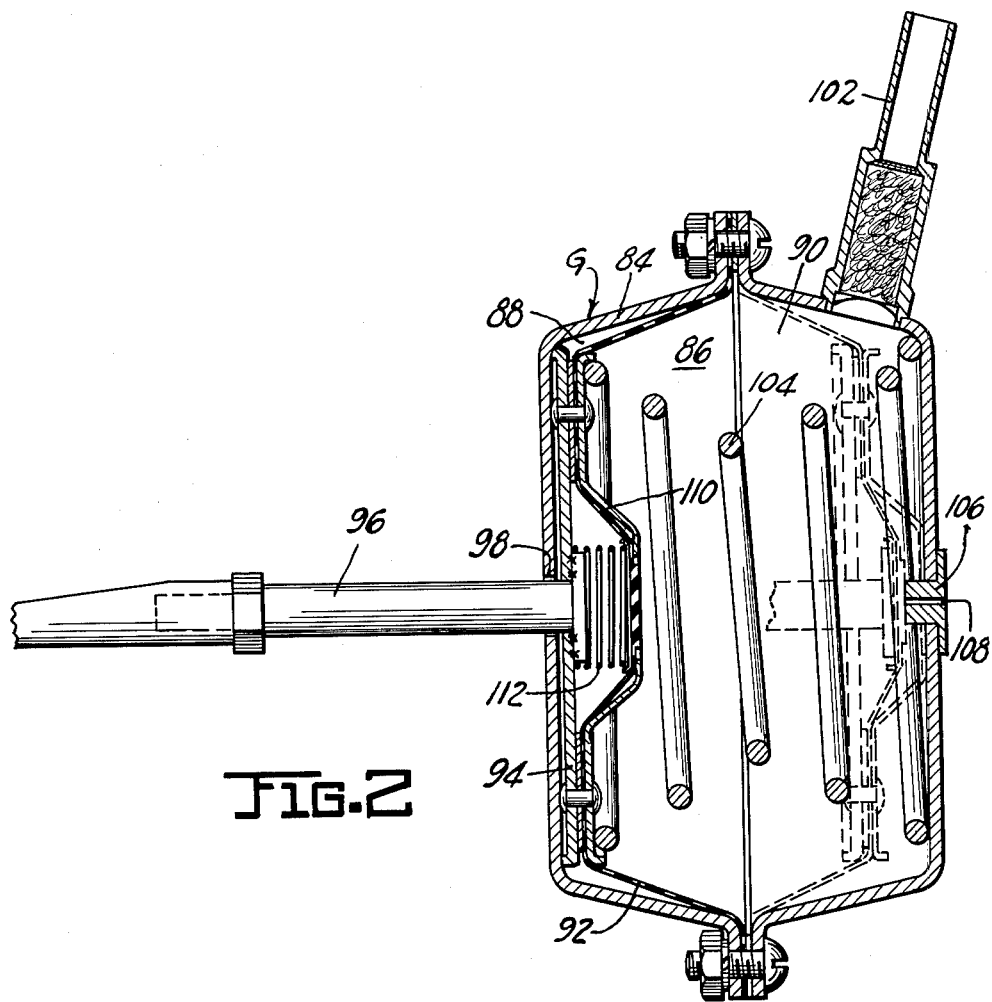

The invention resides in certain constructions and combinations and arrangements of parts, and further objects and advantages will become apparent to those skilled in the art to which the invention relates from the following description of the preferred embodiment described with reference to the accompanying drawings forming a part of this specification, and in which:

FIGURE 1 is a diagrammatic view of an automotive power braking system embodying principles of the present invention, and having certain portions thereof shown in cross-section; and FIGURE 2 is a cross-sectional view of one of the devices of the system shown in FIGURE 1.

The braking system shown in FIGURE 1 generally comprises a primary fluid pressurizing device or master cylinder A which is adapted to be actuated by the conventional foot pedal or brake lever B. Hydraulic pressure from the master cylinder A is conducted to a fluid pressure servo-motor C adapted to intensify the pressure of the hydraulic discharge pressure of the master cylinder A. The fluid pressure servo-motor C incorporates a secondary fluid pressurizing device D having a movable wall 10 therein which divides its fluid pressure chamber 12 into first opposing or follow-up chamber 14 and a second opposing or fluid pressurizing chamber 16. The pressure input signal from the master cylinder A is continually communicated with the follow-up chamber 14 by means of the fluid pressure conduit 18; and the discharge from the fluid pressurizing chamber 16 is continually communicated with the brake applying wheel cylinders 20 (only one of which is shown) of the vehicle by means of the pressure conduit 22.

The movable wall 10 is adapted to be power actuated by means of a force transmitting member or push rod 24 which extends through the follow-up chamber 14 for abutment with the movable wall or piston 10. The push rod 24 is adapted to be actuated by means of a power piston 26 located in the power cylinder chamber 28 of a fluid pressure motor E located at the adjacent end of the secondary fluid pressurizing device D. Vacuum from the manifold 30 of the vehicle's propelling engine is communicated with the adjacent opposing power chamber 32 of the motor E by means of the vacuum conduit 34; and vacuum of equal intensity is communicated with the remote opposing power chamber 36 on the opposite side of the power piston 26, when the motor E is in its normal or non-actuated condition, by means of the servo-motor control valve F. A suitable opening 38 in the end wall of the power cylinder 28 communicates vacuum from the chamber 32 to the vacuum chamber 40 of the control valve. In the normal de-actuating condition of the valve, as shown in the drawing, vacuum from the chamber 40 is communicated with the control chamber 42, and the control chamber 42 is continually communicated with the remote opposing power chamber 36 by means of the control conduit 44.

The vacuum and control chambers 40 and 42 respectively of the control valve are separated by means of a diaphragm 46 having a tubular flow conducting member 48 therethrough which is adapted to be closed off when moved into engagement with a poppet 50 located in the control chamber 42. Movement of the diaphragm 46 is controlled by means of a hydraulic piston 52 which receives its actuating pressure from the master cylinder A through the follow-up chamber 14 and intercommunicating passageway 54. An increase in hydraulic pressure from the master cylinder A causes the piston 52 to bias the diaphragm structure 46 into engagement with the poppet 50 thereby closing off vacuum communication with the back side (opposing chamber 36) of the power piston 26. Further increase in pressure from the master cylinder A causes the diaphragm structure 46 to carry the vacuum poppet 50 with it, and hence lift an associated atmospheric poppet 56 from an atmospheric valve seat 58 located in a partition 60 separating the control chamber 42 from the valve's atmospheric chamber 62. Atmospheric pressure will thereupon be bled into the control chamber 42, and hence to the back side of the power piston 26, until such time as sufficient differential pressure is created across the diaphragm 46 to force the hydraulic piston 52 backwardly and thereby permit a re-seating of the atmospheric poppet 56 upon its seat. Thereafter, the pressure within the control chamber 42 will become stabilized, and the power piston 26 and movable wall 10 will be held stationary in a corresponding actuated condition. Movement of the movable wall 10 will of course build up pressure against the brake applying wheel cylinders 20 proportional to the hydraulic input pressure supplied by the master cylinder A.

Systems of the type so far described will normally include a by-pass or compensating port across the movable wall 10; such that when the power piston 26 is biased into its normal or retracted position, compensating fluid from the reservoir 64 and master cylinder A can pass through the compensating port 66 therein to the follow-up chamber 14, and hence be communicated with the pressurizing chamber 16 to replace any leakage that had occurred during the previous application of the vehicle brakes. Such a system provides the additional advantage of permitting hydraulic pressure from the master cylinder A to be communicated directly with the pressurizing chamber 16 without moving the movable wall 10 whenever power is not available to actuate the push rod 24.

The by-pass or compensating port 66 shown in the drawing comprises an opening 68 extending through the movable wall 10; which opening is adapted to be closed off by means of the end 70 of the push rod 24 when it is biased into engagement with the movable wall 10 during the power actuation thereof. One of the difficulties encountered with such an arrangement is that a negative mechanical advantage is created between the input pressure in the chamber 14 and the pressure developed in the pressurizing chamber 16, when the push rod 70 closes off the opening 68 but does not apply appreciable additional force for moving the movable wall 10. This is true because the input pressure in the chamber 14 is delivered against a smaller area on one side of the movable wall 10, than the area against which the discharge pressure is communicated on the opposite side of the movable wall 10. This condition can occur when the vacuum within the manifold 30 drops to a level just sufficient to enable the fluid pressure motor E to bring the rod 24 into engagement with the movable wall 10; but insufficient to add appreciable force to that being supplied to the movable wall 10 by the master cylinder A. During these times, therefore, the pressure delivered to the brake applying wheel cylinders 20 by the servo-motor C can be less than the pressure of the input signal to the servo-motor C as produced by the master cylinder A.

According to the provisions of the present invention, means are provided for dumping atmospheric pressure into the vacuum supply line 34 leading to the servo-motor C whenever the intensity of the vacuum supplied from the manifold 30 falls below a predetermined value below which the power piston 26 could close off the by-pass opening 68, but could not appreciably add to the force delivered to the movable wall 10 by the hydraulic input signal from the master cylinder A. It is a further desirable feature in systems of the above described type, to provide a foot pedal or brake applying lever mechanism B for the master cylinder A which will have two positions: the first position being a high position, as shown in the drawings, adapted to provide a large fluid displacement in the master cylinder A before the foot pedal lever B comes into contact with the floor board 72 of the vehicle; such that the brakes of the vehicle can be adequately operated by the fluid discharged directly from the master cylinder A during power failure of the servo-motor C. Under such conditions, the discharge of the master cylinder A would pass from the follow-up chamber 14 through the by-pass opening 68 in the movable wall 10 directly to the brake applying wheel cylinders 20 without moving the movable wall 10. The second position of the foot pedal lever B, previously mentioned, would be a somewhat lower position wherein its height would more nearly approach that of the conventional accelerator pedal above the flood board 72. This provides a somewhat smaller displacement which will, however, be sufficient to fill the follow-up cylinder 14, and operate the control valve F when sufficient vacuum is available to operate the servo-motor C.

The system shown for adjusting the position of the foot pedal lever B comprises an incline surface or wedge 74 interpositioned between an abutment 76 mounted on the foot pedal lever B and a cooperating abutment surface 78 on an actuating lever 80; which lever 80 is connected directly with the hydraulic piston 82 of the master cylinder A. Movement of the foot pedal lever B, therefore, causes the abutment 76 to transmit its force through the wedge 74 to the actuating lever 80; thereby stroking the hydraulic piston 82 in the master cylinder. The high pedal position of the foot pedal lever B is provided when the incline surface or wedge 74 is forced inwardly between the abutment 76 and surface 78; and will be lowered into its second position, when the wedge 74 is withdrawn from between the abutment 76 and cooperating surface 78.

According to further principles of the present invention, the wedge 74 is adapted to be moved between the limits of its pedal changing movement by means of a pneumatically actuated snap acting device G. The snap acting device G comprises an enclosure 84 having a power chamber 86 therein which is divided into opposing power chambers 88 and 90 by a movable wall or diaphragm 92. The diaphragm 92 is attached to a stiffening plate 94 having a centrally located rod 96 affixed thereto; the other end of which is suitably connected to the wedge 94. An enlarged opening 98 surrounding the rod 96 continually communicates atmospheric pressure with the opposing chamber 88 on one side of the diaphragm, and vacuum from the manifold 30 is communicated with the opposing chamber 90 on the opposite side of the diaphragm 92 by means of the conduit 100 and vacuum connection 102. The wedge 74 is biased in a direction separating the abutment 76 from its cooperating surface 78 to thereby hold the pedal B in its high position by means of a comparatively stiff coil spring 104 interpositioned between the diaphragm structure 92 and the rear end of the enclosure 84 of the snap acting device G. When the intensity of the vacuum supplied to the chamber 90 differs sufficiently from atmospheric pressure, the force exerted across the diaphragm 92 will be sufficient to compress the coil spring 104 and move the diaphragm structure 92 into engagement with the rear surface of the enclosure 84, as indicated by the dot dash lines shown in FIGURE 2.

The snap acting feature of the device G is obtained by providing an atmospheric connection to the opposing chamber 90, which connection will be closed off by the diaphragm structure 92 when it is held in engagement with the rear surface of the enclosure 84. As shown, the connection is provided by means of a button 106 mounted in the end wall of the enclosure 84; which button 106 has an opening 108 therethrough for admitting the atmospheric pressure to the chamber 90. The opening 108 will preferably be of a small enough size to limit the amount of air which can pass therethrough to a value below that which the vehicle's engine can normally handle; such that sufficient vacuum can normally be created in the opposing chamber 90 by the vehicle's engine to move the diaphragm 92 into engagement with the button 106, and thereby seal off further flow of air into the vacuum system. When the vacuum supplied by the vehicle's engine falls below a predetermined value at which the forces exerted upon the diaphragm 92 will no longer maintain the spring 104 compressed, the diaphragm structure 92 will move out of engagement with the button 106 to cause an abrupt rise in pressure in the opposing chamber 90 and its supplying vacuum system to permit the spring 104 to overcome static friction between the wedge and its abutting surfaces, and thereafter move the wedge 74 for the full length of its travel to raise the foot pedal B into its full uppermost position.

It will be seen that the force utilized to drive the wedge 74 between the abutment 76 and its cooperating surface 78 is obtained from the coil spring 104. It is a property of this type of spring, that more and more force is required to compress the spring as it approaches its collapsed condition; and conversely less and less force is delivered by the spring as it approaches its expanded condition. In order that the size of the diaphragm 92 can be kept to reasonable dimensions, it is desired that the coil spring 104 be no larger than required to force the wedge 74 to its fully extended position between the abutment 76 and its cooperating surface 78. Force delivered by the spring 104 to the wedge 74 changes appreciably as the spring expands from its contracted to its expanded condition; such that the spring 104 would normally (were it not for the present invention) have to be made strong enough when the spring approaches its expanded condition to still be capable of overcoming static friction between the wedge 74 and its abutting surface. In order to assure that the foot pedal lever B will be moved to its high position in all cases (were it not for the present invention), the diaphragm would slowly move from its right-hand position shown in dot dash lines in FIGURE 2 of the drawing to its normal de-energized condition shown in the solid lines of FIGURE 2 as the vacuum delivered to the opposing chamber 90 gradually diminished. Were the diaphragm 92 to remain stationary a fraction of an inch before it had reached its normal position, the spring 104 would have to provide sufficient force at its substantially fully expanded condition to overcome the static friction, as previously mentioned, and drive the wedge 74 into its final pedal raising position.

According to principles of the present invention the spring 104 can be made small enough that it need only provide sufficient force, to overcome the static friction between the wedge and its cooperating abutment surfaces 76 and 78, when in its substantially fully compressed condition; such that once movement of the structure has been started and the static friction has been broken, the structure will be snapped into its extended position, even though the force delivered by the spring 104 has decreased below that required to overcome the static friction of the wedge 74 and its cooperating abutment surfaces 76 and 78 as it approaches its expanded condition.

In the embodiment shown in the drawing, the portion of the diaphragm 92 which abuts and closes the atmospheric opening 108 is confined to a reinforced center portion of the diaphragm that is biased rearwardly against an annular abutment plate 110 mounted on the rear side of the diaphragm by a spring 112. By means of this arrangement, the center portion of the diaphragm can yield and properly align itself with the end of the abutment 106 when the abutment plate 110 is firmly biased into engagement with the end wall of the enclosure 84. The bulk of the force delivered across the diaphragm 92 will therefore be delivered directly to the end wall in closure 84 through the abutment plate 110; while only sufficient force will be transmitted from the center portion of the diaphragm to the button 106 to effect a seal therebetween—thereby increasing the service life of the center portion of the diaphragm. During normal operation of the system shown in the drawing, sufficient vacuum will be created in the manifold 30 of the vehicle's propelling engine to adequately operate the fluid pressure servomotor C, and move the diaphragm 92 of the snap acting device G to its vacuum actuated condition wherein the spring 104 is fully compressed. When the vehicle engine is started and the diaphragm 92 is adjacent the first or left end wall of the enclosure 84 shown in FIGURE 2, a small amount of atmospheric pressure will be bled through the opening 108 into the opposing chamber 90 of the snap acting device, which will be evacuated through the connection 102 by the manifold 30 through line 100 and line 34. Since the engine's capacity is considerably greater than that of the restricted opening 108, pressure within the opposing chamber 90 will gradually be dropped to a value permitting the differential pressure across the diaphragm 92 to fully compress the spring 104, and force the abutment plate 110 into engagement with the opposite end of the closure 94. In this position, the center portion of the diaphragm 92 will be biased into engagement with the end of the button 106 by means of the coil spring 112 to close off further flow of atmospheric pressure into the chamber 90 through the opening 108; thereafter, the diaphragm 92 will be held in its second position compressing the spring 104, even though the vacuum developed within the manifold 30 drops below that required to initially force the diaphragm 92 into abutment with the second end of the enclosure 84.

With the diaphragm structure 92 and its driven elements including the wedge 74 in their retracted positions, the brake lever B will drop to its lower position indicated by the intermediate dotted line in FIGURE 1. In this position, the operator can swivel his foot between the brake pedal lever and the accelerator conveniently, while still being able to satisfactorily operate the vehicle braking system. When sufficient vacuum exists to operate the servo-motor C, and when the foot pedal lever B in its lower position, depressing of the foot pedal lever B causes the piston 82 to move inwardly in the master cylinder A to close off the recuperation port 64, and force fluid through the line 18 to the follow-up chamber 14 in the servo-motor C. This fluid pressure is communicated through passageway 54 to the valve actuating piston 52 causing its tubular flow conducting member 48 to be biased into engagement with the poppet 50; thereby closing off further vacuum communication to the back side of the power piston 26. Continued movement of the piston 52 causes the tubular member 48 to lift the atmospheric poppet 56 from its operating seat 58, and thereby admit atmospheric pressure to the back side of the power piston 26. Air flow to the rear chamber 36 of the servo-motor C continues until such time as the air pressure in the control chamber 42 of the control valve creates a sufficient differential pressure across the diaphragm 46 to balance off the force delivered against the hydraulic piston 52 by the master cylinder A. A static condition thus occurs wherein a corresponding hydraulic pressure is held upon the brake applying wheel cylinders 20. Movement of the power piston 26 causes the piston rod 24 to be moved inwardly into engagement with the end of the movable wall 10 thereby closing off the compensating port 68. Thereafter, fluid pressure from the master cylinder A is prevented from being communicated directly with the fluid pressurizing chamber 16, and will thereafter only be communicated with the follow-up chamber and the hydraulic piston 52 of the control valve F. Inasmuch as the piston rod 24 is of an appreciable size, the volume of fluid forced into the follow-up chamber 14 by the master cylinder A need only be a fraction of that discharged from the fluid pressurizing chamber 16; and therefore the reduced displacement of the master cylinder A as provided by the lower position of the brake pedal B will still be sufficient to satisfactorily operate the braking system, when sufficient vacuum is available to operate the servo-motor C.

When the brake pedal lever B is released, the hydraulic piston 52 of the control valve F will proceed to the left as seen in the drawing permitting the tubular member 48 to separate from the vacuum poppet 50, and to once again communicate vacuum to the back side of the power piston 26. If the foot pedal lever B is only partially retracted, a new condition of equilibrium will be created wherein the differential pressure across the diaphragm 46 balances the force being held against the hydraulic piston 52 by the master cylinder A to establish a corresponding level of pressure in the chamber 36; and thereby cause a somewhat reduced amount of force to be delivered to the movable wall 10 through the piston rod 24. When the foot pedal lever B is completely released, the power piston 26 will proceed to its fully retracted position wherein the end 70 of the push rod 24 will move out of engagement with the movable wall 10, and thereby permit the discharge pressure of the master cylinder A to be again directly communicated with the fluid pressurizing chamber 16.

During power failure of the device, i.e. when insufficient vacuum is created in the manifold 30 to satisfactorily operate the system, insufficient vacuum will exist in the opposing chamber 90 of the snap acting device G to hold the diaphragm structure 92 adjacent the second end of the enclosure 84. The spring 104 therefore causes the diaphragm structure 92 to move away from the end of the enclosure 84; and once this happens, the center portion of the diaphragm is picked up by abutment 110 and moved away from the end of the button 106. This allows a rush of air to proceed through the opening 108 into the chamber 90, and thereafter further decrease the differential pressure across the chamber 92; thereby permitting the spring 104 to snap the diaphragm structure 92 into engagement with the opposite end of the enclosure 84. With the wedge 74 in its retracted position and the spring 104 in its fully compressed condition, sufficient force will be created by the spring 104 to overcome the static friction between the wedge 74 and its cooperating abutment surfaces 76 and 78. Once this static friction has been broken by the spring 104, the wedge 74 will be driven upwardly into its fully extended position, and the diaphragm structure 92 will proceed into engagement with the first end of the enclosure 84. Movement of the wedge 74 into its upper position raises the foot pedal lever B to its corresponding raised position to provide a displacement for the master cylinder A capable of operating the braking system without the aid of the servo-motor C. When the brake lever B is initially supported in its upper position and the system is thereafter operated to discharge pressure from the master cylinder, fluid will again proceed through the line 18 to the follow-up chamber 14, through the compensating port 68 to the pressurizing chamber 16, to operate the brake applying wheel cylinders 20 directly by the force which is created in the master cylinder A. Inasmuch as the diaphragm 92 in the snap acting device G has been moved away from the button 106 at this time, a continual flow of atmospheric pressure will be bled into the power supply system for the servo-motor C; thereby disabling the servo-motor, such that substantially full atmospheric pressure will be communicated with its opposing chamber 32. Atmospheric pressure therefore will exist on both sides of the power piston 26 regardless of the stroking of the control valve F by the hydraulic piston 52; such that insufficient forces will be created on the power piston 26 to force the piston rod 24 into engagement with the movable wall 10. The compensating port 68 will, therefore, not be closed under these conditions; such that pressure from the master cylinder A will continue to be communicated with the pressurizing chamber 16 throughout the stroke of the foot pedal lever B; and the brakes of the vehicle will, therefore, be operated directly from the pressure as developed by the master cylinder A. When sufficient vacuum to operate the system satisfactorily is again created in the manifold 30, the diaphragm structure 32 of the snap acting device will be moved into its energized condition closing off the bleed port 108 to cause the servo-motor C to again be operable; and at the same time cause the brake lever B to drop into its lower position.

It will be seen that the objects heretofore enumerated as well as others have been accomplished, and that there has been provided a new and improved automotive power braking system and the like having a new and improved pneumatically actuated snap acting device incorporating an improved valve arrangement therein which will dissipate the pneumatic power supply to the fluid pressure servo-motor when the intensity of the power supply increases below a level wherein the servo-motor can no longer properly operate; and which system provides a snap action mechanism whose driving force is obtained by a spring which need not provide sufficient force in its expanded condition to overcome static friction in its driven elements. It will also be apparent, that while the particular type of compensating or by-pass arrangement used in the movable wall 10 of the secondary fluid pressurizing device D employs the end of the piston rod 24 to close off its compensating port 68, any type of valving arrangement can be utilized to close off the by-pass or reciprocating port upon movement of the piston rod 24, as for example that shown in the E. J. Ringer Patent 2,598,604.

While the invention has been described in considerable detail, I do not wish to be limited to the particular construction shown and described and it is my intention to cover hereby all novel adaptations, modifications and arrangements thereof which come within the practice of those skilled in the art to which the invention relates, and which come within the purview of the following claims.

We claim:
1. In a braking system and the like: a driven device; manually actuatable means normally connected to said driven device to operate said driven device; power actuated means for actuating said driven device, said power actuated means disconnecting said manually actuatable means from said driven device when said power actuated means is power actuated; a power supply for said power actuated means; energy level sensing means connected to said power supply, said sensing means having a first condition when said energy level to said servo-motor is above a predetermined level and a second con- dition when said energy is below said predetermined level; and means responsive to said sensing means for disabling said power actuated means to prevent its disconnecting said manually actuatable means from said driven device when said energy level sensing means moves into its second condition.

2. In a hydraulic braking system and the like: a primary fluid pressurizing device, a secondary fluid pressurizing device having first and second opposing chambers separated by a movable wall, a pneumatically powered motor having a movable element for causing said movable wall to force fluid out of said second opposing chamber, means connecting said primary pressurizing device to said first opposing chamber, pressure responsive control means actuated by said primary pressurizing device for controlling said motor, said control means applying pressure differential between a first pneumatic pressure source and a second variable pneumatic pressure source across said movable element of said motor when said control means is actuated by the fluid pressure from said primary pressurizing device, compensating means communicating opposite sides of said movable wall when said movable wall is in its retracted position, said compensating means being closed by the initial power actuated movement of said motor's movable element, and means for communicating said sources of supply of pneumatic pressure to said motor, said means including a valve which is responsive to the pressure differential between said sources and causing said valve to be in a closed condition when said pressure differential is above a predetermined value and to be in an opened condition when the pressure differential between said sources falls below a predetermined value to thereby prevent said motor from being actuated and said compensating means closed at a time when substantially no power assistance can be developed by said motor.

3. In a hydraulic braking system and the like: a primary fluid pressurizing device, a secondary fluid pressurizing device having first and second opposing chambers separated by a movable wall, a fluid pressure servomotor having a chamber divided into first and second opposing chambers by a movable wall, said servomotor movable wall having a normal retracted position and being connected to said movable wall of said secondary fluid pressurizing device to force fluid out of its second opposing chamber when actuated, means connecting said primary pressurizing device to said first opposing chamber of said secondary pressurizing device, a substantially constant pressure source, a variable pressure source whose pressure normally differs from said constant pressure source, said variable pressure source being communicated to said first opposing chamber of said sermomotor, a control valve actuated by said primary pressurizing device, said control valve normally communicating said variable pressure source to said second opposing chamber of said servomotor and communicating said substantially constant pressure source to said second opposing chamber of said servomotor when actuated to force fluid out of said second fluid pressurizing device, compensating means communicating opposite sides of said movable wall of said secondary fluid pressurizing device when said movable wall of said servomotor is in its normal retracted position, said compensating means being closed by the initial power actuated movement of said sermomotor's movable wall, and means for communicating said sources of supply of pressure to said motor, said means including a valve which is responsive to the pressure differential between said sources and causing said valve to be in a closed condition when said pressure differential is above a predetermined value and to be in an opened condition when the pressure differential between said sources approaches within a predetermined limit of said substantially constant pressure source.

4. In a hydraulic braking system and the like: a primary fluid pressurizing device, a secondary fluid pressurizing device having first and second opposing chambers separated by a movable wall, a pneumatically powered motor having a movable element for causing said movable wall to force fluid out of said second opposing chamber, means connecting said primary pressurizing device to said first opposing chamber, pressure responsive control means connected to said primary pressurizing device for controlling said motor, said control means applying pressure differential between a first pneumatic pressure source and a second variable pneumatic pressure source across said movable element of said motor when said control means is actuated by fluid pressure from said primary pressurizing device to force fluid out of said second opposing chamber, compensating means communicating opposite sides of said movable wall when said movable wall is in its retracted position, said compensating means being closed by the initial power actuated movement of said motor's movable element, lever actuating means for said primary pressurizing device, said means having a low position providing a short stroke and limited fluid displacement in said primary pressurizing device and a high position providing greater travel and greater fluid displacement in said primary pressurizing device, motor means also actuated by said pressure differential for moving said lever actuating means from its low position to its high position when said pressure differential falls below a predetermined value, and means for communicating said sources of supply of pneumatic pressure to said motor, said means including a valve which is responsive to the pressure differential between said sources and causing said valve to be in a closed condition when said pressure differential is above a predetermined value and in an opened condition when the pressure differential between said sources falls below said predetermined value to thereby prevent said motor from being actuated to close said compensating means and to simultaneously cause said lever actuating means to be moved to its high position.

References Cited in the file of this patent

UNITED STATES PATENTS

| | | |
|---|---|---|
| 1,433,695 | Bostwick | Oct. 31, 1922 |
| 1,492,159 | Caretta | Apr. 29, 1924 |
| 2,311,120 | Mossinghoff | Feb. 16, 1943 |
| 2,365,960 | Ingres | Dec. 26, 1944 |
| 2,372,842 | Mossinghoff | Apr. 3, 1945 |
| 2,510,651 | Osburn | June 6, 1950 |
| 2,596,040 | Nutt | May 6, 1952 |
| 2,661,598 | Thomas | Dec. 8, 1953 |
| 2,664,707 | Edge | Jan. 5, 1954 |
| 2,685,277 | Schroyer | Aug. 3, 1954 |
| 2,706,020 | Freers et al. | Apr. 12, 1955 |
| 2,755,891 | Levell et al. | July 24, 1956 |
| 2,805,725 | Ayers | Oct. 15, 1957 |
| 2,836,265 | Ingres | May 27, 1958 |
| 2,844,228 | Schnell | July 22, 1958 |
| 2,848,980 | Ayers | Aug. 26, 1958 |
| 2,910,147 | Fishtahler et al. | Oct. 27, 1959 |